United States Patent
Goossens et al.

(10) Patent No.: US 6,727,302 B2
(45) Date of Patent: Apr. 27, 2004

(54) TRANSPARENT, FIRE-RESISTANT POLYCARBONATE

(75) Inventors: Johannes M. D. Goossens, Bergen op Zoom (NL); Bart P. G. Hendrix, Bergen op Zoom (NL); Walter van der Heijden, Oosterhout (NL); Christianus J. J. Maas, Rilland (NL); Hendrik Verhoogt, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 09/825,191

(22) Filed: Apr. 3, 2001

(65) Prior Publication Data

US 2003/0060548 A1 Mar. 27, 2003

(51) Int. Cl.⁷ .................................. C08K 5/42
(52) U.S. Cl. ................ 524/161; 524/166; 524/268; 525/474
(58) Field of Search ................ 524/161, 166, 524/268; 525/474

(56) References Cited

U.S. PATENT DOCUMENTS

| | | | |
|---|---|---|---|
| 3,635,895 A | 1/1972 | Kramer | 525/462 |
| 3,971,756 A | 7/1976 | Bialous et al. | |
| 4,001,184 A | 1/1977 | Scott | 528/182 |
| 4,110,299 A * | 8/1978 | Mark | 524/84 |
| 4,130,530 A | 12/1978 | Mark et al. | |
| 4,217,438 A | 8/1980 | Brunelle et al. | 528/207 |
| 4,387,176 A | 6/1983 | Frye | 524/268 |
| 4,464,497 A | 8/1984 | Belfoure | 624/114 |
| 4,732,949 A | 3/1988 | Paul et al. | 524/464 |
| 4,735,978 A | 4/1988 | Ishihara | 524/162 |
| 4,774,273 A | 9/1988 | Kress et al. | 524/158 |
| 4,916,194 A | 4/1990 | Policastro et al. | |
| 4,994,510 A | 2/1991 | Naar et al. | 524/162 |
| 5,026,791 A | 6/1991 | Hawkins et al. | 529/464 |
| 5,068,302 A | 11/1991 | Horlacher et al. | 528/2 |
| 5,084,527 A | 1/1992 | Yamamoto et al. | |
| 5,153,251 A | 10/1992 | Lupinski et al. | 524/165 |
| 5,187,243 A | 2/1993 | Jordan et al. | 525/464 |
| 5,218,027 A | 6/1993 | Smith et al. | 524/265 |
| 5,274,017 A | 12/1993 | Pan | 524/262 |
| 5,364,899 A | 11/1994 | Watanabe et al. | 524/268 |
| 5,385,970 A | 1/1995 | Gallucci et al. | 524/533 |
| 5,449,710 A | 9/1995 | Umeda et al. | 524/165 |
| 5,508,323 A | 4/1996 | Romenesko et al. | |
| 5,663,280 A | 9/1997 | Ogoe et al. | 528/196 |
| 5,916,980 A | 6/1999 | Ogawa et al. | 525/460 |
| 5,955,542 A | 9/1999 | Davis et al. | 525/101 |
| 6,031,036 A | 2/2000 | Rosenquist et al. | 524/164 |
| 6,284,824 B1 | 9/2001 | Iji et al. | |
| 6,454,969 B1 * | 9/2002 | Nishihara | 252/609 |
| 6,541,548 B2 * | 4/2003 | Weidner et al. | 524/108 |

FOREIGN PATENT DOCUMENTS

| | | |
|---|---|---|
| DE | 198 50 453 | 5/1999 |
| EP | 0522753 A2 | 1/1993 |
| EP | 0524730 A1 | 1/1993 |
| EP | 0 625 547 A1 | 11/1994 |
| EP | 0 829 521 | 3/1998 |
| EP | 0 918 073 A2 | 5/1999 |
| EP | 1 035 169 | 9/2000 |

OTHER PUBLICATIONS

Analysis of first sample received, completed in Feb., 2000.
Analysis of recent samples: #166473, clear blue molded part from Japan; #169122, clear, colorless pellets from France.
MSDS and fax cover sheet (dated Jan. 31, 2000) on original sample.
XP002174566 Abstract of Japanese patent 2000 297214 A,(Asahi Kasei Kogyo KK), Oct. 24, 2000.
XP–002174567 Abstract of Japanese patent 06 128434 A (Shinetsu Chem Ind Co Ltd) May 10, 1994.
Abstract of Japanese patent 06306265, (Idemitsu Petrochem Co Ltd) Jan. 11, 1994.
Abstract of Japanese patent 2000327897, (NEC Corp), Nov. 28, 2000.

* cited by examiner

*Primary Examiner*—Peter Szekely
(74) *Attorney, Agent, or Firm*—Oppedahl & Larson LLP

(57) ABSTRACT

A transparent, fire resistant polycarbonate composition comprises polycarbonate, poly(methylphenylsiloxane) and a salt based flame retardant. These polycarbonate compositions can attain UL94 V0 ratings at 1.6 millimeter thickness, previously possible only with a halogenated fire retardant.

19 Claims, No Drawings

TRANSPARENT, FIRE-RESISTANT POLYCARBONATE

BACKGROUND OF THE INVENTION

This invention relates to fire resistant polycarbonate compositions and more particularly transparent, fire resistant polycarbonate compositions.

Plastics are increasingly being used to replace metals in a wide variety of applications, from car exteriors to aircraft interiors. Flame retardant plastics have been especially useful, particularly in applications such as housings for electronic devices. The use of plastic instead of metal decreases weight, improves sound dampening and makes assembly of the device easier. Flame resistance has been predominantly provided by halogenated flame retardants, especially bromine- and chlorine-based flame retardants. However, plastics employing halogenated flame retardants may release toxic gas when heated to elevated temperatures. As a result, bromine- and chlorine-free fire resistant materials are in demand for a wide range of applications.

Transparent, fire resistant polycarbonate products are widely used in various applications such as household appliances, computers, electronic devices and glazing material for the building and construction industry. Acceptable flame resistance in combination with transparency in a polycarbonate composition is presently achieved using halogenated polycarbonate building blocks together with one or more sulphonate salt based fire retardants such as potassium diphenylsulfon-3-sulphonate (KSS) or potassium-perfluorobutane-sulphonate (Rimar salt). The combination of the halogenated building blocks and the sulphonate salt based fire retardants results in a synergistic effect. While these materials do not burn, they could release toxic gas when heated to elevated temperatures.

Polysiloxanes are known to impart fire resistance to many plastics, including polycarbonate materials. The resulting materials are not likely to release toxic gas when exposed to high temperatures. Unfortunately, the commonly known polysiloxanes cause haziness in polycarbonate materials thus diminishing the desired transparency.

Accordingly there remains a need in the art for transparent, fire resistant polycarbonate compositions which are essentially free of halogens.

BRIEF SUMMARY OF THE INVENTION

The above discussed and other drawbacks and deficiencies of the prior art are overcome or alleviated by a transparent, fire resistant polycarbonate composition comprising polycarbonate, poly(methylphenylsiloxane) and a salt based flame retardant, wherein the polycarbonate composition has a UL94 V0 rating for the fire resistance at thickness greater than or equal to about 1.6 millimeters.

The above discussed and other features and advantages of the present invention will be appreciated and understood by those skilled in the art from the following detailed description.

DETAILED DESCRIPTION OF THE INVENTION

The transparent, fire resistant polycarbonate composition comprises polycarbonate, poly(methylphenylsiloxane) and a salt based flame retardant wherein the polycarbonate composition has a UL94 V0 rating for the fire resistance at thickness greater than or equal to about 1.6 millimeters.

Unexpectedly, poly(methylphenylsiloxane), unlike most polysiloxanes, does not affect the optical properties of polycarbonate compositions. Thus, when poly(methylphenylsiloxane) is used in a polycarbonate composition in combination with a salt based flame retardant, such as KSS or Rimar salt, the resulting transparent polycarbonate composition is fire resistant. Transparent is herein defined as having a percent transmission of about 85 and a haze value of about 5 when measured according to ASTM D1003, which is incorporated herein by reference, at a thickness of 3.2 mm. Preferably the transparent polycarbonate composition has a percent transmission of about 90 and a haze value of about 2.

Such transparent polycarbonate compositions can obtain UL94 V0 ratings at 1.6 mm thickness, something previously achievable only with a bromine or chlorine based fire retardant.

In an important feature of the present composition, the polycarbonate is essentially free of halogens. Essentially free of halogen is herein defined as amounts insufficient to produce toxic fumes when burned. In general, therefore, the polycarbonate will comprise less than about 1.0, preferably less than about 0.5, and most preferably less than about 0.2 percent by weight of a halogen. As used herein, the terms "polycarbonate" and "polycarbonate composition" includes compositions having structural units of the formula (I):

in which at least about 60 percent of the total number of $R^1$ groups are aromatic radicals and the balance thereof are aliphatic, alicyclic, or aromatic radicals. Preferably, $R^1$ is an aromatic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantyl-idene. The bridging radical $Y^1$ can be an unsaturated hydrocarbon group or a saturated hydrocarbon group such as methylene, cyclohexylidene or isopropylidene.

Polycarbonates may be prepared by reacting a dihydroxy compound with a carbonate precursor such as phosgene, a haloformate, a carbonate or a carbonate ester, generally in the presence of an acid acceptor and a molecular weight regulator. Useful polymerization methods include interfacial polymerization, melt polymerization, and redistribution. Dihydroxy compounds in which only one atom separates $A^1$ and $A^2$ are the most widely used. As used herein, the term "dihydroxy compound" includes, for example, bisphenol compounds having general formula (III) as follows:

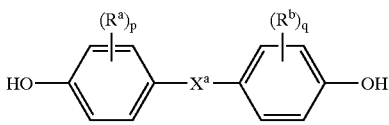

(III)

wherein $R^a$ and $R^b$ each represent a monovalent hydrocarbon group and may be the same or different; p and q are each independently integers from 0 to 4; and $X^a$ represents one of the groups of formula (IV):

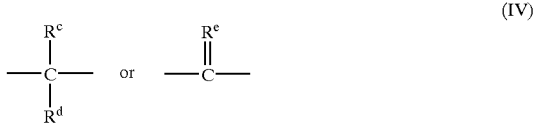

(IV)

wherein $R^c$ and $R^d$ each independently represent a hydrogen atom or a monovalent linear or cyclic hydrocarbon group and R' is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following:

1,1-bis(4-hydroxyphenyl) methane;
1,1-bis(4-hydroxyphenyl) ethane;
2,2-bis(4-hydroxyphenyl) propane (hereinafter "bisphenol A" or "BPA");
2,2-bis(4-hydroxyphenyl) butane;
2,2-bis(4-hydroxyphenyl) octane;
1,1-bis(4-hydroxyphenyl) propane;
1,1-bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
bis(hydroxyaryl) alkanes such as 2,2-bis(4-hydroxyphenyl) propane;
1,1-bis(4-hydroxyphenyl) cyclopentane; and
bis(hydroxyaryl) cycloalkanes such as 1,1-bis(4-hydroxyphenyl) cyclohexane.

It is also possible to employ two or more different dihydroxy compounds or copolymers of a dihydroxy compound with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) alpha,alpha-dimethyl benzyl)phenol, trimesic acid and benzophenone tetracarboxylic acid. The branching agents may be added at a level of about 0.05-2.0 weight percent. Branching agents and procedures for making branched polycarbonates are described in U.S. Pat. Nos. 3,635,895 and 4,001,184 which are incorporated by reference. All types of polycarbonate end groups are contemplated as being within the scope of the present invention.

Preferred polycarbonates are based on bisphenol A, in which each of $A^1$ and $A^2$ is p-phenylene and $Y^1$ is isopropylidene. Preferably, the average molecular weight of the polycarbonate is in the range of about 5,000 to about 100,000, more preferably in the range of about 10,000 to about 65,000, and most preferably in the range of about 15,000 to about 35,000. Furthermore the polycarbonate has a melt viscosity index (MVI) of about 4 to about 30 cm$^3$/10 min.

Poly(methylphenylsiloxane) as used herein means a polymer having a plurality of units with the formula:

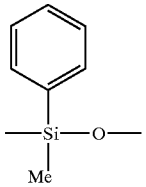

Useful poly(methylphenylsiloxane)s have a viscosity of about 1 to about 300 centistoke (cSt) at 25° C. Preferably the poly(methylphenylsiloxane) has a viscosity of about 4 to about 20 cSt and contains at least two silicon atoms in the polymer chain, and comprises internal methylphenylsiloxane units only. Additionally, copolymers of poly(methylphenylsiloxane) may be useful, wherein the polymer further comprises dimethoxysiloxane units. Preferably the number of methylphenylsiloxane units comprises greater than about 50%, more preferably greater than about 80%, and most preferably greater than about 90% of the total number of units.

Useful salt based flame retardants include alkali metal or alkaline earth metal salts of inorganic protonic acids as well as organic Brönsted acids comprising at least one carbon atom. These salts should not contain chlorine and/or bromine. Preferably the salt based flame retardants are sulphonates and even more preferably they are selected from the group consisting of potassium diphenylsulfon-3-sulphonate (KSS), potassium-perfluorobutane-sulphonate (Rimar salt) and combinations comprising at least one of the foregoing. The poly(methylphenylsiloxane) and salt based flame retardant(s) are present in quantities effective to achieve a UL94-V2 and preferably a UL94 V0 flame resistant rating. Such quantities may be readily determined by one of ordinary skill in the art. In general, poly(methylphenylsiloxane) may be used in amounts of about 0.02 weight percent (wt %) to about 1.5 wt %, preferably 0.5 wt % to about 0.9 wt %, based on the total weight of the composition. Salt based flame retardants may be used in amounts of about 0.01 wt % to about 1.0 wt % based on the total weight of the composition. Preferably, when the salt based flame retardant is Rimar Salt, the amount of Rimar Salt is about 0.05 wt % to about 0.12 wt % based on the total weight of the composition. When the salt based flame retardant is KSS the amounts are 0.55 wt % or less, preferably 0.25 wt % or less based on the total weight of the composition.

The polycarbonate composition may include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; and blowing agents. Examples of fillers or reinforcing agents include glass fibers, glass beads, carbon fibers, silica, talc and calcium carbonate. Examples of heat stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl) isocyanurate, tristearin and epoxidized soybean oil. Examples of the antistatic agent include glycerol monostearate, sodium stearyl sulfonate, and sodium dodecylbenzenesulfonate. Examples of mold releasing agents include pentaerythritoltetrastearate stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The transparent, fire resistant polycarbonate composition may be made by intimately mixing the polycarbonate, poly(methylphenylsiloxane), and salt based flame retardant either in solution or in melt, using any known mixing method. Typically, there are two distinct mixing steps: a premixing step and a melt mixing step. In the premixing step, the ingredients are mixed together. This premixing step is typically performed using a tumbler mixer or a ribbon blender. However, if desired, the premix may be manufactured using a high shear mixer such as a Henschel mixer or similar high intensity device. The premixing step must be followed by a melt mixing step where the premix is melted and mixed again as a melt. Alternatively, it is possible to eliminate the premixing step, and simply add the raw materials directly into the feed section of a melt mixing device (such as an extruder) via separate feed systems. In the melt mixing step, the ingredients are typically melt kneaded in a single screw or twin screw extruder, and extruded as pellets.

The invention is further illustrated by the following non-limiting Examples.

EXAMPLES

The following examples were made using the materials listed in Table 1 according to the formulations listed in Tables 2–8. All amounts are weight percent based on the total resin weight unless otherwise indicated. Viscosity of the poly(methylphenylsiloxane) was measured at 25° C.

All ingredients were mixed in a ribbon blender and extruded on a Leistritz twin screw extruder at a melt temperature of 300° C. The obtained granulate was then dried at 120° C. for 2 hours prior to injection molding at 300° C. The resulting plaques (2.5 mm thick unless otherwise stated) and flammability bars (127×12.7 mm×thickness) were used to measure optical properties (transmission and haze according ASTM D1003) and flammability performance. From the granulate the melt viscosity index (MVI) was measured according ISO 1133 (300° C./1.2 kg), which is incorporated herein by reference, in units of cm$^3$/10 min.

Flammability tests were performed following the procedure of Underwriter's Laboratory Bulletin 94 entitled "Tests for Flammability of Plastic Materials, UL94", which is incorporated herein by reference. According to this procedure, the materials were classified as either UL94 V-0, UL94 V-1 or UL94 V-2 on the basis of the test results obtained for five samples. The procedure and criteria for each of these flammability classifications according to UL94, are, briefly, as follows:

Procedure: A total of 10 specimens (2 sets of 5) are tested per thickness. Five of each thickness are tested after conditioning for 48 hours at 23° C., 50% relative humidity. The other five of each thickness are tested after conditioning for seven days at 70° C. The bar is mounted with the long axis vertical for flammability testing. The specimen is supported such that its lower end is 9.5 mm above the Bunsen burner tube. A blue 19 mm high flame is applied to the center of the lower edge of specimen for 10 seconds. The time till the flaming of the bar ceases is recorded. If burning ceases, the flame is re-applied for an additional 10 seconds. Again the time till the flaming of the bar ceases is recorded. If the specimen drips particles, these shall be allowed to fall onto a layer of untreated surgical cotton placed 305 mm below the specimen.

Criteria for flammability classifications according to UL94:

|  | V0 | V1 | V2 |
|---|---|---|---|
| Individual flame time (s) | ≦10 | ≦30 | ≦30 |
| Total flame time of 5 specimen (s) | ≦50 | ≦250 | ≦250 |
| Glowing time of individual specimen (s) | ≦30 | ≦60 | ≦60 |
| Particles ignite cotton | No | No | Yes |

A few examples have NC (no classification) performance in the UL94 test. NC performance indicates that the flammability exceeded the V2 rating.

The flame out times from four sets of five UL bars (20 bars total) was used to generate a p(FTP) value. The p(FTP) value is a statistical evaluation of the robustness of UL94 V0 performance. When the p(FTP) value is one or nearly one the material is expected to consistently meet the UL94 V0 rating.

TABLE 1

| Material | Trade Name/Source | Properties |
|---|---|---|
| Polycarbonate | GE Plastics | MVI = 8, 10, 12, 16, 20 |
| Tris(2,4-di-t-butyl-phenyl)phosphite | Irgaphos 168 Ciba Geigy | Heat stabilizer |
| Pentaerythritoltetrastearate (PETS) | Glycolube P/Lonza Loxiol EP8578/Henkel | Release agent |

TABLE 1-continued

| Material | Trade Name/Source | Properties |
|---|---|---|
| Rimar Salt (potassium-perfluorobutane-sulphonate) | Bayowet C4/Bayer | Flame retardant |
| KSS (diphenylsulfon-3-sulphonate) | KSS/Seal Sands, Sloss | Flame retardant |
| Poly(methylphenylsiloxane) | PK20/GE Bayer Silicones | 20 centistokes (cSt) |
| Poly(methylphenylsiloxane) | CF1142/GE Silicones | 40 cSt |
| Poly(methylphenylsiloxane) | PD5/GE Bayer Silicones | 4 cSt |
| Poly(methylphenylsiloxane) | PL oil/GE Bayer Silicones | 200 cSt |
| Poly-methylsiloxane, phenyl end groups | SF1555/GE Bayer Silicones | 12 cSt |
| Poly-methylsiloxane, phenyl end groups | CF1301/GE Bayer Silicones | Branched siloxane |
| Brominated polycarbonate | PC105B/GE-Plastics | Flame retardant |

Examples 1–10

Examples 1 through 10 were made according to the method described above using two poly(methylphenylsiloxane)s (CF1142 and PK20), differing only in viscosity and molecular weight. Examples 1–4 are comparative examples and outside the scope of the invention. Example 1 contains a brominated flame retardant and reflects the desired UL94 V0 performance. Examples 2–4 reflect the flammability performance of the compositions with only one of the claimed flame retardants or none at all. The compositions were molded into 3.2 mm bars for fire resistance testing. The composition was also molded into plaques 2.5 mm thick for transparency testing. Formulations and results are shown in Table 2.

polycarbonate compositions (target MVI=20). Examples 11–13 are comparative examples. Example 11 contains a brominated fire retardant and illustrates the desired flame resistant behavior. Example 12 is polycarbonate without any flame retardant and Example 13 is polycarbonate containing poly(methylphenylsiloxane) but no salt based flame retardant. Examples 12 and 13 were also made according the method described above however they were only tested for UL94 performance after conditioning for 48 hours at 23° C. and 50% relative humidity.

Importantly, there is no observable decrease in the percentage of transmission or increase of haze when poly(methylphenylsiloxane) is present compared to when it is not (example 12 compared to Example 13). Replacing Rimar salt by KSS resulted in compositions having similar

TABLE 2

|  | 1* | 2* | 3* | 4* | 5 | 6 | 7 | 8 | 9 | 10 |
|---|---|---|---|---|---|---|---|---|---|---|
| Polycarbonate MVI = 10 | 98.75 | 99.5 | 98.8 | 99.43 | 99.33 | 99.13 | 98.93 | 99.13 |  |  |
| Polycarbonate MVI = 8 |  |  |  |  |  |  |  |  | 98.93 |  |
| Polycarbonate MVI = 16 |  |  |  |  |  |  |  |  |  | 98.93 |
| KSS | 0.25 |  |  |  |  |  |  |  |  |  |
| PC105B | 0.5 |  |  |  |  |  |  |  |  |  |
| Irgaphos 168 | 0.1 | 0.1 | 0.1 | 0.1 | 0.1 | 0.1 | 0.1 | 0.1 | 0.1 | 0.1 |
| PETS | 0.4 | 0.4 | 0.4 | 0.4 | 0.4 | 0.4 | 0.4 | 0.4 | 0.4 | 0.4 |
| Rimar salt |  |  |  | 0.07 | 0.07 | 0.07 | 0.07 | 0.07 | 0.07 | 0.07 |
| PK20 |  |  | 0.7 |  | 0.1 | 0.3 | 0.5 |  | 0.5 | 0.5 |
| CF1142 |  |  |  |  |  |  |  | 0.3 |  |  |
| Measured MVI | 9.4 | 9.9 | 10.5 | 9.8 | 9.8 | 10.1 | 10.1 | 9.8 | 8.5 | 15.9 |
| UL94 at 3.2 mm | 4xV0 | 2xNC | 2xNC | V0 | V0 | 2xV0 | V0 | V0 | 8xV0 | 4xV0 |
| Number of bars tested | 20 | 10 | 10 | 5 | 5 | 10 | 5 | 5 | 40 | 20 |
| p(FTP) for UL94 V0 | 1 | 0 | 0 | 0.74 | 0.54 | 0.97 | 1 | 0.85 | .999/.903 | 0.939 |
| % Transmission | 90.7 | 90.7 | 90.5 | 90.6 | 90.7 | 90.6 | 90.7 | 90.6 | 90.6 | 90.3 |
| Haze | 1.2 | 0.4 | 0.5 | 0.7 | 0.7 | 0.6 | 0.4 | 0.6 | 0.8 | 0.5 |

*Comparative Example

The results from Examples 1–10 show the positive effect of combining Rimar salt with poly(methylphenylsiloxane). The extrapolated p(FTP) value is increased by the addition of poly(methylphenylsiloxane) without affecting the optical properties. The synergistic effect of the poly(methylphenylsiloxane) and salt based flame retardant is observed in polycarbonate compositions covering a MVI range of 8–16.

The second series of experiments (Examples 11–19) were performed in order to determine the fire retardant effect of KSS and poly(methylphenylsiloxane) for low viscosity flame retardance. At a KSS concentration above 0.25 wt % the haze value is only slightly increased.

At a thickness of 3.2 mm the desired flammability performance of UL94 V0 could not be achieved for Examples 12 and 13. These examples indicate necessity of a salt based flame retardant. Surprisingly for Example 13 an UL94-V2 rating could be obtained while for Example 12 no robust UL94 classification could be obtained because of flame-out times exceeding 30 seconds. This exhibits the positive effect on flammability performance of the presence of a poly(methylphenylsiloxane) in a low viscosity polycarbonate.

TABLE 3

|  | 11 | 12 | 13 | 14 | 15 | 16 | 17 | 18 | 19 |
|---|---|---|---|---|---|---|---|---|---|
| Polycarbonate MVI = 20 | 98.75 | 99.55 | 98.85 | 98.95 | 98.6 | 98.25 | 98.55 | 98.6 | 98.65 |
| Irgaphos 168 | 0.1 | 0.1 | 0.1 | 0.1 | 0.1 | 0.1 | 0.1 | 0.1 | 0.1 |
| PETS | 0.4 | 0.4 | 0.4 | 0.4 | 0.4 | 0.4 | 0.4 | 0.4 | 0.4 |
| KSS | 0.25 | — | — | 0.25 | 0.4 | 0.55 | 0.25 | 0.4 | 0.55 |
| PK20 | — | — | 0.7 | 0.3 | 0.5 | 0.7 | 0.7 | 0.5 | 0.3 |
| Brominated PC | 0.5 | — | — | — | — | — | — | — | — |
| Measured MVI | 19.9 | 19.3 | 20.3 | 19.7 | 19.7 | 20.1 | 19.9 | 19.7 | 19.1 |
| Conditioning at 23° C. UL94 at 3.2 mm | 4xV0 | 1xV2/ 1xNC | 2xV2 | 4xV0 | 1xV2/ 3xV0 | 4xV0 | 4xV0 | 4xV0 | 1xV2/ 3xV0 |
| p(FTP) | 1 | 0 | 0 | 0.832 | 0.746 | 0.962 | 0.956 | 0.798 | 0.669 |
| Conditioning at 70° C. UL94 at 3.2 mm | 4xV0 | — | — | 4xV0 | 1xV2/ 3xV0 | 4xV0 | 4xV0 | 4xV0 | 4xV0 |
| p(FTP) | 0.995 | — | — | 0.804 | 0.614 | 0.954 | 0.946 | 0.943 | 0.879 |
| % Transmission | 90.2 | 90.5 | 90.4 | 90.3 | 90.1 | 89.9 | 90.4 | 90.1 | 90 |
| Haze | 2 | 0.5 | 0.8 | 1.2 | 2 | 3.2 | 1.1 | 2 | 3.4 |

Examples 20–25

Based on the results listed in Table 3 Examples 20–25 were made according to the method described above. The amounts of poly(methylphenylsiloxane) and KSS were varied to optimize the flammability performance and the optical properties. Prior to flammability testing samples were conditioned at 23° C. and 50% relative humidity for 48 hours and at 70° C. for 7 days.

TABLE 4

|  | 20 | 21 | 22 | 23 | 24 | 25 |
|---|---|---|---|---|---|---|
| Polycarbonate MVI = 20 | 98.55 | 98.58 | 98.38 | 98.53 | 98.73 | 98.55 |
| Irgaphos 168 | 0.1 | 0.1 | 0.1 | 0.1 | 0.1 | 0.1 |
| PETS | 0.4 | 0.4 | 0.4 | 0.4 | 0.4 | 0.4 |
| KSS | 0.25 | 0.325 | 0.325 | 0.175 | 0.175 | 0.25 |
| PK20 | 0.7 | 0.6 | 0.8 | 0.8 | 0.6 | 0.7 |
| Measured MVI | 20.9 | 20.7 | 21 | 21.2 | 20.4 | 21.1 |
| Conditioning at 23° C. UL94 at 3.2 mm | 4xV0 | 4xV0 | 4xV0 | 4xV0 | 4xV0 | 4xV0 |
| p(FTP) | 0.966 | 0.943 | 0.973 | 0.957 | 0.892 | 0.931 |
| Conditioning at 70° C. UL94 at 3.2 mm | 4xV0 | 4xV0 | 4xV0 | 4xV0 | 4xV0 | 4xV0 |
| p(FTP) | 0.871 | 0.897 | 0.999 | 0.901 | 0.869 | 0.983 |
| % Transmission | 90.3 | 89 | 89.9 | 90.5 | 90.3 | 90 |
| Haze | 1.7 | 3.4 | 2.9 | 1.1 | 1.4 | 2 |

Based on the data in Table 4, preferred formulations for polycarbonate compositions with a MVI=20 are based on a poly(methylphenylsiloxane) concentration of about 0.6 wt % or higher and a KSS concentration about 0.25 wt %. With respect to the measured haze, a KSS concentration of about 0.25 wt % is preferred over higher concentrations.

The following examples describes the use of KSS in combination with poly(methylphenylsiloxane) in polycarbonate compositions having a MVI of 10. Examples 26–37 were made according to the method described above. Examples 26–28 are comparative examples. Prior to flammability testing samples were conditioned at 23° C. and 50% relative humidity for 48 hours and at 70° C. for 7 days. Examples 27 and 28 were made according the method described above however they were tested for flammability after conditioning for 48 hours at 23° C. and 50% relative humidity.

TABLE 5

|  | 26 | 27 | 28 | 29 | 30 | 31 | 32 | 33 | 34 | 35 | 36 | 37 |
|---|---|---|---|---|---|---|---|---|---|---|---|---|
| Polycarbonate MVI = 10 | 98.75 | 98.8 | 99.5 | 98.93 | 98.83 | 98.79 | 98.63 | 98.95 | 98.988 | 98.75 | 98.53 | 98.95 |
| Irgaphos 168 | 0.1 | 0.1 | 0.1 | 0.1 | 0.1 | 0.1 | 0.1 | 0.1 | 0.1 | 0.1 | 0.1 | 0.1 |
| PETS | 0.4 | 0.4 | 0.4 | 0.4 | 0.4 | 0.4 | 0.4 | 0.4 | 0.4 | 0.4 | 0.4 | 0.4 |
| KSS | 0.25 | — | — | 0.175 | 0.175 | .1125 | 0.175 | 0.05 | .1125 | 0.05 | 0.175 | 0.05 |
| PK20 | — | — | 0.7 | 0.4 | 0.5 | 0.6 | 0.7 | 0.5 | 0.4 | 0.7 | 0.8 | 0.5 |
| Brominated PC | 0.5 | — | — | — | — | — | — | — | — | — | — | — |
| MVI | 9.4 | 9.9 | 10.5 | 9.75 | 9.6 | 9.9 | 9.9 | 9.8 | 9.8 | 10.2 | 9.9 | 10.1 |
| Conditioning at 23° C. UL94 at 3.2 mm | 4xV0 | 2xNC | 2xNC | 4xV0 | 4xV0 | 4xV0 | 4xV0 | 4xV0 | 4xV0 | 4xV0 | 4xV0 | 4xV0 |
| p(FTP) | 1 | 0 | 0 | 0.998 | 0.903 | 0.824 | 0.955 | 0.897 | 0.766 | 0.982 | 0.973 | 0.845 |
| Conditioning at 70° C. UL94 at 3.2 mm | 4xV0 | — | — | 4xV0 | 4xV0 | 4xV0 | 4xV0 | 4xV0 | 4xV0 | 4xV0 | 4xV0 | 4xV0 |
| p(FTP) | 1 | — | — | 0.97 | 0.956 | 0.808 | 0.872 | 0.926 | 0.86 | 0.983 | 0.813 | 0.8 |

Examples 29–37 show robust UL94 V0 performance at a thickness of 3.2 mm The desired flammability performance of UL94 V0 could not be achieved for Examples 27 and 28 because of flame-out times exceeding 30 seconds. These formulations exhibit the necessity of a salt based flame retardant. Surprisingly for Example 28 less burning drips (11) were observed than for Example 27 (18 burning drips). This exhibits the positive effect on flammability performance of the presence of a poly(methylphenylsiloxane) in a medium viscosity polycarbonate.

Examples 38–41 were made according to the method described above. Bars for UL94 were 3.0 mm thick. The results listed in Table 6 illustrate the effect of the viscosity of the poly(methylphenylsiloxane) when used in conjunction with a low viscosity polycarbonate.

TABLE 6

|  | 38 | 39 | 40 | 41 |
|---|---|---|---|---|
| Polycarbonate Target MVI=20 | 98.55 | 98.55 | 98.55 | 98.55 |
| PETS | 0.4 | 0.4 | 0.4 | 0.4 |
| KSS | 0.25 | 0.25 | 0.25 | 0.25 |
| Irgaphos 168 | 0.1 | 0.1 | 0.1 | 0.1 |
| PD5 | 0.7 | — | — | — |
| PK20 | — | 0.7 | — | — |
| CF1142 | — | — | 0.7 | — |
| PL oil | — | — | — | 0.7 |
| Measured MVI | 21.0 | 20.7 | 20.1 | 20.6 |
| UL94 at 3.0 mm | 3x V0/ 1x V2 | 4x V2 | 4x V2 | 4x V2 |
| Number of Burning drips | 1 | 7 | 9 | 11 |

Examples 42–44

Examples 42–44 were made according to the method described above. The compositions were molded into 2.5 mm thick bars for fire resistance testing. The compositions were also molded into plaques 2.5 and 3.2 mm thick for optical properties testing. Examples 42–44 illustrate the effect on properties by the molecular structure of the siloxane used. Formulations and results are shown in Table 7.

TABLE 7

|  | 42 | 43 | 44 |
|---|---|---|---|
| Polycarbonate Target MVI-21 | 98.77 | 98.77 | 98.77 |
| PD5 | 0.7 | — | — |
| SF1555 | — | 0.7 | — |
| CF1301 | — | — | 0.7 |
| Rimar salt | 0.08 | 0.08 | 0.08 |
| Irgaphos 168 | 0.1 | 0.1 | 0.1 |
| PETS | 0.35 | 0.35 | 0.35 |
| Measured MVI | 21.2 | 20.9 | 20.1 |
| % Transmission (2.5 mm) | 90.2 | 89.8 | 88.7 |
| % Transmission (3.2 mm) | 89.8 | 89.2 | 87.7 |
| Haze at 2.5 mm | 0.8 | 1.5 | 1.7 |
| Haze at 3.2 mm | 1.2 | 1.8 | 2.5 |
| UL94 at 2.5 mm | 8xV0 | 4xV0 | 4xV0 |
| Number of bars tested | 40 | 20 | 20 |
| p(FTP) | 0.922/0.904 | 0.938 | 0.879 |

Based on the data in Table 7 it can be concluded that the type of siloxane used resulted in a minor effect on the optical properties. The used SF1555 contains more methyl groups and less phenyl groups in its molecular structure than PD5. The formulation based on SF1555 formulation resulted in a slight increase of haze and decrease of transparency over the PD5 containing formulation. The composition based on CF1301 resulted in an even bigger reduction of transparency and increase of haze. The molecular structure of CF1301 is comparable to SF1555, however CF1301 is mainly branched. The type of siloxane used did not affect the desired flammability performance.

Examples 45–52

Examples 45–52 were made according to the method described above. The compositions were molded into 2.5, 2.0 and 1.6 mm thick bars for fire resistance testing. The compositions were also molded into plaques 2.5 and 3.2 mm thick for optical properties testing. The composition of formulation 48 is identical to the composition of formulation 52. Formulations and results are shown in Table 8.

TABLE 8

|  | 45 | 46 | 47 | 48 | 49 | 50 | 51 | 52 |
|---|---|---|---|---|---|---|---|---|
| Polycarbonate Target MVI-12 | 99.46 | 98.46 | 98.77 | 98.61 | 98.75 | 98.45 | 98.47 | 98.61 |
| PETS | 0.35 | 0.35 | 0.35 | 0.35 | 0.35 | 0.35 | 0.35 | 0.35 |
| Irgaphos 168 | 0.1 | 0.1 | 0.1 | 0.1 | 0.1 | 0.1 | 0.1 | 0.1 |
| Rimar salt | 0.09 | 0.09 | 0.08 | 0.09 | 0.1 | 0.1 | 0.08 | 0.09 |
| PD5 | — | 1 | 0.7 | 0.85 | 0.7 | 1 | 1 | 0.85 |
| Measured MVI | 12.2 | 13 | 12.7 | 12.4 | 12.4 | 12.7 | 12.4 | 12.6 |
| % Transmission (2.5 mm) | 89.7 | 89.3 | 89.9 | 89.9 | 88.9 | 88.9 | 90.3 | 89.6 |
| % Transmission (3.2 mm) | 89.2 | 88.6 | 88.6 | 88.5 | 88 | 87.8 | 89.7 | 88.8 |
| Haze at 2.5 mm | 1.3 | 1.7 | 1.1 | 1.7 | 3.1 | 2.9 | 1 | 1.5 |
| Haze at 3.2 mm | 1.5 | 2.4 | 1.2 | 2.4 | 4.1 | 4.5 | 0.9 | 1.8 |
| UL94 at 2.5 mm | 1xV0/ 3xV2 | 4xV0 | — | V0 | — | — | — | V0 |
| p(FTP) | 0 | 0.972 | — | — | — | — | — | — |
| Number of burning drips | 7 | 0 | — | — | — | — | — | — |
| UL94 at 2.0 mm | — | — | 3xV0/ 1xV2 | 4xV0 | 4xV0 | 4xV0 | 3xV0/ 1xV2 | 4xV0 |
| UL94 at 1.6 mm | — | — | 2xV2 | 4xV0 | 4xV0 | 4xV0 | 2xV2 | 2xV0 |

At a thickness of 2.0 mm the desired flammability performance is observed at a Rimar salt concentration higher than 0.08%. At a thickness of 1.6 mm the desired flammability performance is observed at a Rimar salt concentration of 0.1%. The preferred concentration for flammability performance contains 1% PD5 and 0.1% Rimar salt. At increased Rimar salt load the haze is increased and the transmission is decreased. The effect however is less when the thickness of the material is decreased. Flammability performance of Example 49 was also measured for 3.2 mm and 2.5 mm thick bars; for both thicknesses a robust V0-rating was obtained. As can be seen in the preceding examples poly(methylphenylsiloxane) when used in combination with a salt based fire retardant in a polycarbonate composition provides excellent fire resistance while maintaining transparency, even in the absence of halogenated polycarbonates and bromine and/or chlorine containing fire retardants. Excellent results are obtained even for thin materials, which are more difficult to effectively render flame retardant.

The resulting transparent, fire resistant compositions are essentially free of bromine and/or chlorine and are particularly useful because they do not give off a toxic gas when heated to elevated temperatures. Products manufactured from these compositions can be integrated in applications on which ecological certificates are required. While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A transparent, fire resistant, polycarbonate composition comprising polycarbonate, poly(methylphenylsiloxane), and a salt based flame retardant composition, wherein the poly(methylphenylsiloxane) comprises subunits of the formula

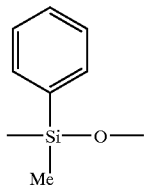

in an amount of greater than 50% of the total number of subunits in the poly(methylphenylsiloxane).

2. A composition according to claim 1, wherein the poly(methylphenylsiloxane) further comprises dimethoxysiloxane subunits.

3. A composition according to claim 1, wherein the poly(methylphenylsiloxane) comprises subunits of the formula

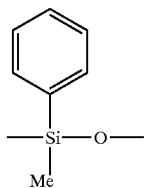

an amount of greater than 80% of the total number of subunits in the poly(methylphenylsiloxane).

4. A composition according to claim 3, wherein the poly(methylphenylsiloxane) further comprises dimethoxysiloxane subunits.

5. A composition according to claim 1, wherein the poly(methylphenylsiloxane) comprises subunits of the formula

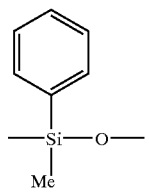

in an amount of greater than 90% of the total number of subunits in the poly(methylphenylsiloxane).

6. A composition according to claim 5, wherein the poly(methylphenylsiloxane) further comprises dimethoxysiloxane subunits.

7. A composition according to claim 1, wherein the poly(methylphenylsiloxane) is a methylphenylsiloxane hompolymer.

8. The composition of claim 1 wherein the polycarbonate has a melt viscosity index of 4 to 30 $cm^3/10$ mm.

9. The composition of claim 1 wherein the poly(methylphenylsiloxane) has a viscosity of 1 to 300 centistokes.

10. The composition of claim 9, wherein the poly(methylphenylsiloxane) has a viscosity of 4 to 20 centistokes.

11. The composition of claim 1 wherein the poly(methylphenylsiloxane) is present in amount of 0.02 to 1.5 weight percent based on the total weight of the composition.

12. The composition of claim 1 wherein the salt based flame retardant is selected from the group consisting of alkali metal salts of inorganic protonic acids, alkaline earth metal salts of inorganic protonic acids, alkali metal salts of organic Brönsted acids and alkaline earth metal salts of organic Brönsted acids.

13. The composition of claim 12 wherein the salt based flame retardant is a sulphonate.

14. The composition of claim 13 wherein the salt based flame retardant is diphenylsulfon-3-sulphonate.

15. The composition of claim 14 wherein the diphenylsulfon-3-sulphonate is present in amounts of 0.55% or less, based on the total weight of the composition.

16. The composition of claim 15 wherein the diphenylsulfon-3-sulphonate is present in amounts of 0.25% or less, based on the total weight of the composition.

17. The composition of claim 13 wherein the salt based flame retardant is potassium-perfluorobutane-sulfonate.

18. The composition of claim 17 wherein the potassium-perfluorobutane-sulfonate is present in amounts of about 0.05 wt % to about 0.12 wt % based on the total weight of the composition.

19. The composition of claim 1 wherein the salt based flame retardant is present in amounts of 0.01 wt % to 1.0 wt % based on the total weight of the composition.

* * * * *